United States Patent
Cozzens et al.

(10) Patent No.: US 11,029,185 B2
(45) Date of Patent: Jun. 8, 2021

(54) TANK GAUGE

(71) Applicant: RAMPART STRONG, LLC, Baggs, WY (US)

(72) Inventors: Jonathon Taylor Cozzens, Douglas, WY (US); Benjamin Tyler Cozzens, Baggs, WY (US); Joshua Tucker Cozzens, Baggs, WY (US); Stephen Burton Farnsworth, Lehi, UT (US)

(73) Assignee: RAMPART STRONG, LLC, Baggs, WY (US)

( * ) Notice: Subject to any disclaimer, the term of this patent is extended or adjusted under 35 U.S.C. 154(b) by 372 days.

(21) Appl. No.: 16/170,970

(22) Filed: Oct. 25, 2018

(65) Prior Publication Data

US 2019/0162575 A1 May 30, 2019

Related U.S. Application Data

(60) Provisional application No. 62/592,911, filed on Nov. 30, 2017.

(51) Int. Cl.
| | |
|---|---|
| *G01F 23/22* | (2006.01) |
| *G01F 17/00* | (2006.01) |
| *G01F 23/00* | (2006.01) |
| *G01F 22/00* | (2006.01) |

(52) U.S. Cl.
CPC .............. *G01F 23/22* (2013.01); *G01F 17/00* (2013.01); *G01F 22/00* (2013.01); *G01F 23/0076* (2013.01)

(58) Field of Classification Search
CPC ...... G01F 23/22; G01F 23/0076; G01F 22/00; G01F 17/00; G01F 23/284
See application file for complete search history.

(56) References Cited

U.S. PATENT DOCUMENTS

| | | | |
|---|---|---|---|
| 6,711,949 B1 * | 3/2004 | Sorenson | G01F 23/38 340/623 |
| 7,635,854 B1 * | 12/2009 | Babin | G01F 23/2928 250/573 |
| 2004/0119037 A1 * | 6/2004 | Mentzer | G01F 23/292 250/573 |
| 2006/0144140 A1 * | 7/2006 | Hache | G01F 23/22 73/295 |
| 2012/0206595 A1 * | 8/2012 | Alphenaar | F17D 3/00 348/135 |

(Continued)

*Primary Examiner* — Herbert K Roberts
*Assistant Examiner* — John M Royston
(74) *Attorney, Agent, or Firm* — Workman Nydegger

(57) ABSTRACT

A tank storage measurement device. The tank storage measurement device includes a display screen. The tank storage measurement device is configured to display on the display screen an image of a storage tank. The tank storage measurement device is additionally configured to use the image of the storage tank to identify boundaries of the storage tank and identify a qualitative level of a substance in the storage tank. The tank storage measurement device is additionally configured to generate a quantitative representation of the level of the substance using the identified boundaries and identified qualitative level of the substance. The tank storage measurement device is additionally configured to display on the display screen the generated quantitative representation of the level of the substance.

20 Claims, 8 Drawing Sheets

(56) References Cited

U.S. PATENT DOCUMENTS

2016/0203365 A1* 7/2016 Breedvelt-Schouten ................... G06T 19/006 345/633
2017/0050562 A1* 2/2017 Jinno ....................... F02M 5/00
2018/0070019 A1* 3/2018 Laurent .............. H04N 5/23206

* cited by examiner

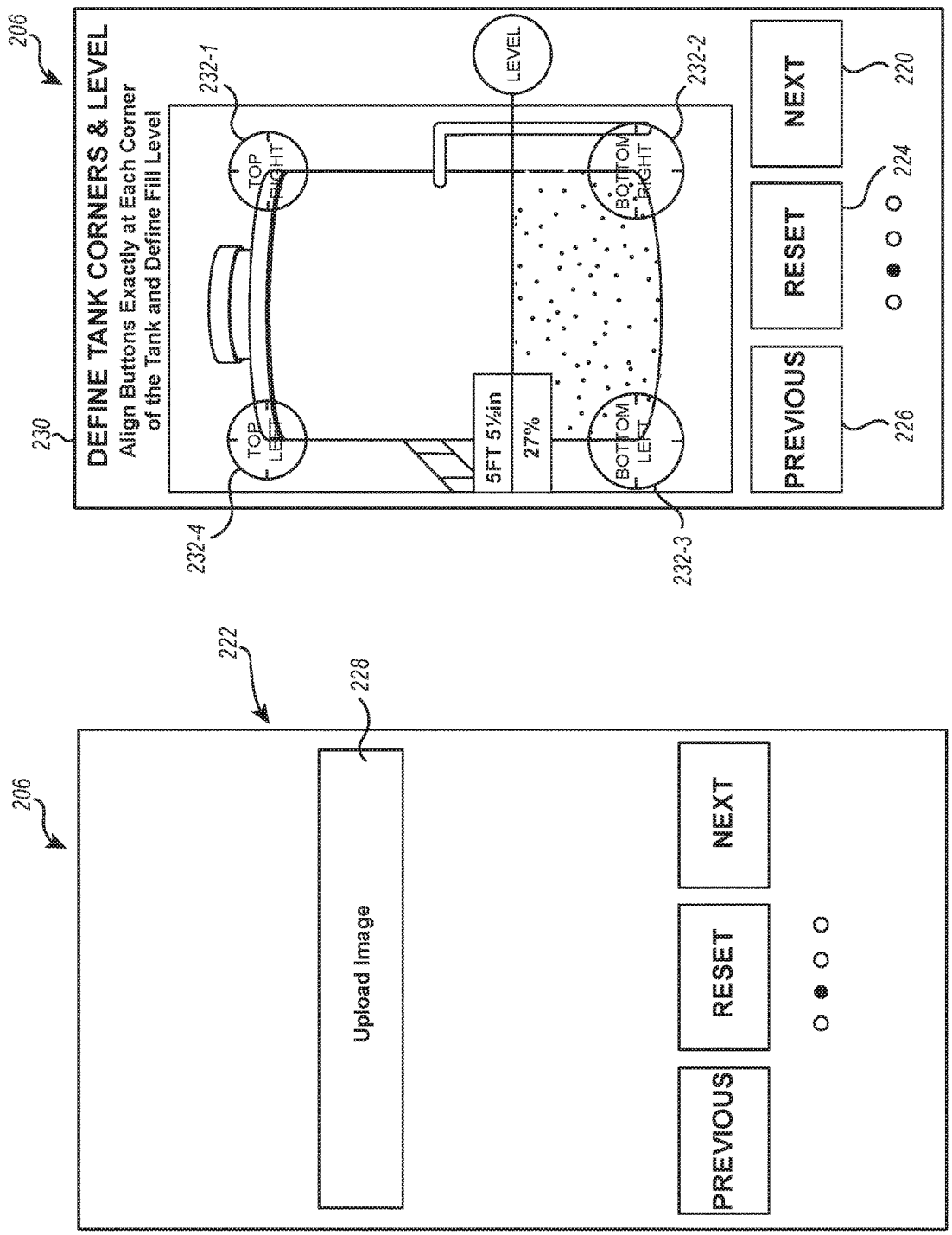

TANK GAUGE

CROSS-REFERENCE TO RELATED APPLICATIONS

This application claims the benefit of and priority to U.S. Provisional Patent Application Ser. No. 62/592,911 filed on Nov. 30, 2017 and entitled "INFRARED GAUGE," which application is expressly incorporated herein by reference in its entirety.

BACKGROUND

Background and Relevant Art

Storage of substances in tanks is ubiquitous. For example, storage tanks are used to store crude raw substances such as raw crude oil; fuel such as gasoline, diesel, kerosene, ethanol, produced water, etc.; waste substances; etc. there is often a need to inspect the tanks to determine the amount of substances in the tank. This is often a dangerous and cumbersome process. For example, often a tank inspector will need to don special apparel to prevent caustic or otherwise hazardous substance from contacting the inspector and/or the inspector's clothing. The inspector will then need to open the tank from the top and perform a visual inspection along with placing a probe, such as a dipstick or gauge tape, into the tank. At various times during this process, various risk factors are encountered including asphyxiation, chemical burns, heat burns, poisoning, contamination, explosion ignition via static electricity, etc.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

On embodiment illustrated herein includes a tank storage measurement device. The tank storage measurement device includes a display screen. The tank storage measurement device is configured to display on the display screen an image of a storage tank. The tank storage measurement device is additionally configured to use the image of the storage tank to identify boundaries of the storage tank and identify a qualitative level of a substance in the storage tank. The tank storage measurement device is additionally configured to generate a quantitative representation of the level of the substance using the identified boundaries and identified qualitative level of the substance. The tank storage measurement device is additionally configured to display on the display screen the generated quantitative representation of the level of the substance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 4C illustrates another state of the acquire photo screen;
FIG. 5A illustrates a define tank corners and level screen.

DETAILED DESCRIPTION

Figure 1:
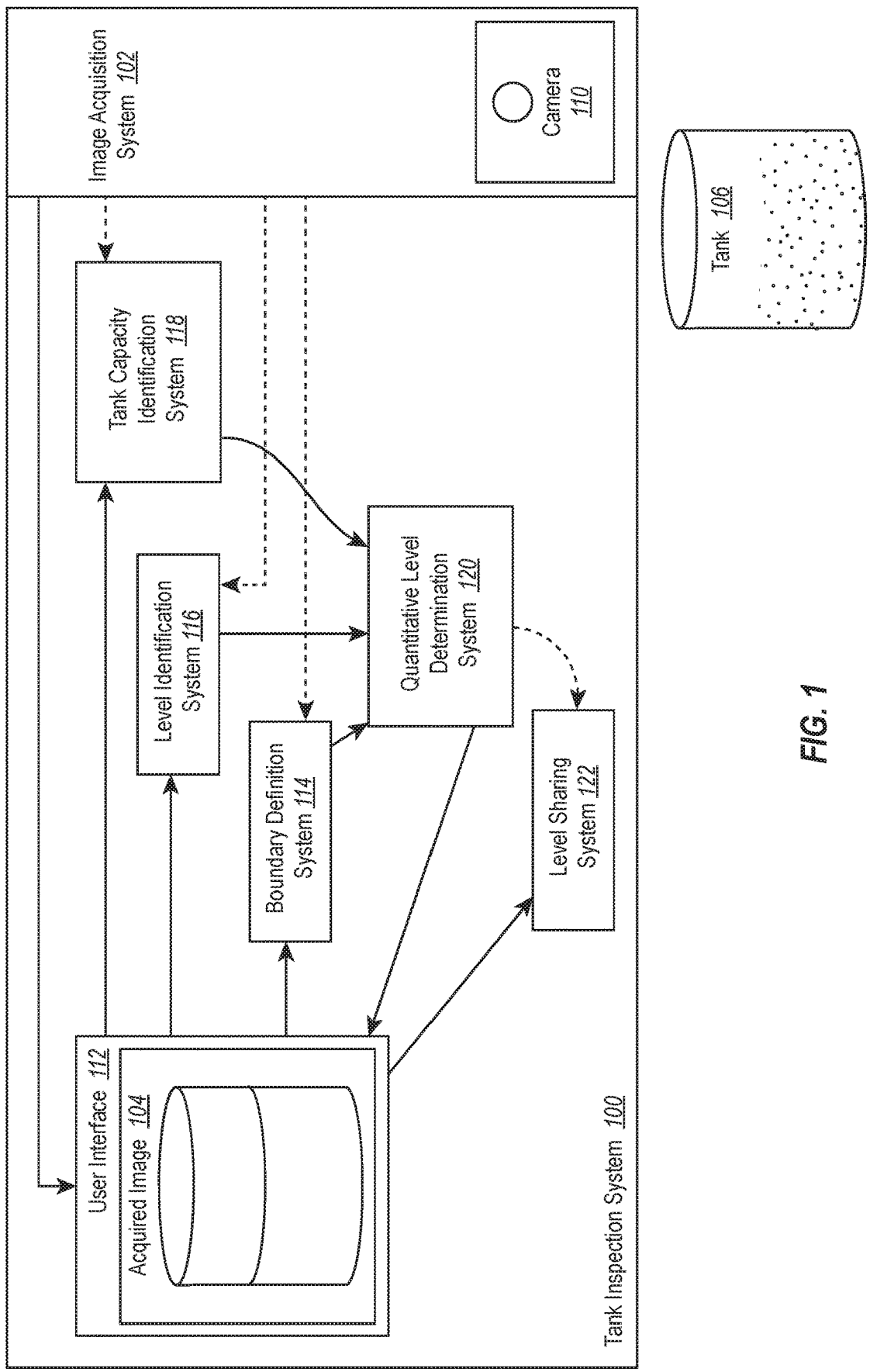
FIG. 1 illustrates a tank inspection system.

Some embodiments illustrated herein are directed to a tank inspection system that allows an inspector to quickly and safely identify the level of the tank without needing to physically and directly contact the tank, either themselves or with any equipment. Rather, by using images of the tank, a quantitative level of the tank can be quickly identified and presented to the inspector in a new and novel user interface. In particular, the user interface can present to the inspector a quantitative tank level, such as a numeric value of the percent of capacity of the tank and/or a numeric value identifying the amount of substance in the tank. In particular, previously an inspector might only have a qualitative idea of the level of substance in the tank. Even if a user interface were able to display an image of the tank, such a user interface did not display a quantitative level of the tank, but rather would have only been capable of displaying the qualitative level of the tank. For example, the inspector might have been able to qualitatively say "the tank appears to be about half full." However, using the unique and novel user interface illustrated herein, an image of the tank can be used to identify quantitatively a value so that, for example, the inspector would be able to see a numeric value of, for example, 43%. Alternatively, or additionally, the user interface may be able to identify a quantity, such as for example 600 gallons.

Some embodiments illustrated herein are directed to a tank inspection system 100 which includes an image acquisition system 102 that allows the tank inspection system 100 to acquire an image 104 of a tank 106. The image acquisition system 102 is able to acquire an image 104 that shows a substance level in the tank 106. In some embodiments, the image acquisition system 102 may include a camera 110.

For example, if the tank 106 is somewhat translucent, such as if the tank 106 is a polyethylene tank, often the image acquisition system 102 can include a simple camera 110 that is able to detect coloring and/or shading differences between the portions of the tank 106 having a substance in them and portions of the tank 106 not having the substance in them. For example, a liquid in a polyethylene tank will allow an image 104 to be acquired where the portions of the acquired image 104 are darker for the lower half of the tank 106 having the liquid in the tank 106. The upper portions of the tank 106 not storing the liquid will appear lighter in the acquired image 104.

Alternatively, or additionally, some embodiments may use a thermal camera 110 as part of the image acquisition system 102. A thermal camera 110 can detect temperature differences and represent those temperature differences in an acquired image 104. For example, a black-and-white thermal image may show lower temperatures closer to black and higher temperatures closer to white along a grayscale. Alternatively, or additionally, a color thermal image may represent various temperatures at colors along a spectrum. A thermal image may be used to detect the level of a substance in a tank 106. For example, in some embodiments, the substance will be at a temperature that is cooler than the surrounding air, and thus will appear at a lower temperature in a thermal image acquired by an image acquisition system 102. However, it should be appreciated, that in some circumstances the substance in the tank 106 will actually be warmer than surrounding air. Nonetheless, this will appear as a contrasting color or shade in a thermal image.

Note that various different types of cameras and camera arrangements may be used in the image acquisition system 102. In some embodiments, the tank inspection system 100 may implement a tank storage measurement device by using a cellular telephone, portable computer, or other computing device. Often these devices include cameras integral to the device. This integral camera may be used in the image acquisition system 102 to acquire the image 104 of the tank 106.

Alternatively, or additionally, other types of integral or selectively attachable cameras may be used. For example, in some embodiments, the tank inspection system 100 is implemented using a portable device such as a cellular telephone, portable computer, or other computing device. This device may have functionality for connecting external cameras. For example, many devices include a USB port allowing a USB based camera to be connected to the device. Alternatively, or additionally, if the tank inspection system 100 is implemented using devices available from Apple Corporation of Cupertino Calif., the lightning connection port on such devices may be used to connect external cameras. For example, in some embodiments, the Flir One Pro camera with a lightning connector available from Flir System of Wilsonville Oreg., may be used by connecting the device to an Apple device to implement the image acquisition system 102.

In some embodiments, the camera 110 may be remote to other parts of the tank inspection system 100. For example, in some embodiments, the camera 110 may be mounted to various vehicles and/or tools that are able to connect through a communications network to the tank inspection system 100. For example, in some embodiments, the camera 110 is mounted to a UAV such as a drone, where the drone can fly proximate the tank 106 to acquire images of the tank 106. Alternatively, or additionally, other types of vehicles such as various robots, manned or unmanned ground vehicles, or other vehicles can carry the camera 110, and include communications hardware allowing any images acquired by the camera 110 to be transmitted to the tank inspection system 100 for later use.

Note that in some embodiments, the camera 110 may be statically placed proximate the tank 106 to allow for continuous monitoring of tank levels and conditions.

Images may be acquired in other fashions. For example, in some embodiments, a user interface 112 may be presented to a user which allows the user to upload a previously generated image. In particular, the user can interact with the user interface 112 to identify a file or other format of an image 104 of the tank 106. The image acquisition system 102 in conjunction with the user interface 112 may be used to upload such images for use by the tank inspection system 100.

Embodiments may further include a boundary definition system 114 which allows for the boundaries of the tank 106 in an acquired image 104 to be defined. In some embodiments, this can be user assisted using a graphical user interface 112 that allows a user to assist the boundary definition system 114 in identifying boundaries of the tank 106. In particular, the novel graphical user interface 112 can display the acquired image 104 in the graphical user interface 112. Additionally, the graphical user interface 112 will present various user interface elements that allows a user to assist in identifying boundaries of the tank 106 in the image 104 displayed in the graphical user interface 112. Examples of these elements will be illustrated in more detail below. The solid arrow from the graphical user interface 112 to the boundary definition system 114 represents the user assisted input into the boundary definition system 114.

In alternative, or additional embodiments, automated systems may be able to identify boundaries of the tank 106 from the acquired image 104 by detecting various color and/or shading differences. The dotted arrow from the image acquisition system 102 to the boundary definition system 114 illustrates an example where an image can be provided directly to the boundary definition system 114, where the boundary definition system 114 includes functionality for automatically identifying boundaries of the tank 106 in the acquired image 104. In particular, the boundary definition system 114 may include image recognition components configured to identify shapes, boundaries, specific items, or other elements. These image recognition components can be used to identify tank boundaries in the acquired image 104. In some embodiments, the image recognition components can be rule-based components that are able to evaluate various rules and conditions to identify tank boundaries in the acquired image 104. Alternatively, or additionally, the image recognition components may use artificial intelligence principles to fine-tune tank boundary identification.

Embodiments may further include a level identification system 116. The level identification system 116 is able to identify the level of substances in the tank 106 within the boundaries identified in the boundary definition system 114. In some embodiments, the level identification system 116 uses the contrasting colors or shades from the acquired image 104 to identify the level of substance in the tank 106.

In some embodiments, the level identification system 116 may be user assisted allowing a user to interact with a novel graphical user interface 112 displaying the acquired image 104 along with various user interface elements to identify the level of the substance in the tank 106. Examples of such user interface elements will be illustrated in more detail below. The solid arrow from the graphical user interface 112 to the level identification system 116 represents the user assisted input into the level identification system 116.

In alternative or additional embodiments, automated systems may be able to identify the tank 106 level by examining the acquired image 104 to detect various color and/or shading differences. The dotted arrow from the image acquisition system 102 to the level identification system 116 illustrates an example where an image can be provided directly to the level identification system 116, where the level identification system 116 includes functionality for automatically identifying a level of substance in the tank 106 in the acquired image 104. In particular, the level identification system 116 may include image recognition components configured to identify shapes, boundaries, specific items, or other elements. These image recognition components can be used to identify tank levels in the acquired image 104. In some embodiments, the image recognition components can be rule-based components that are able to evaluate various rules and conditions to identify tank levels in the acquired image 104. Alternatively, or additionally, the image recognition components may use artificial intelligence principles to fine-tune tank level identification.

Note that the level identification system 116 typically identifies a qualitative level. In particular, the level identification system 116 does not necessarily quantitatively identify the level of the tank 106, but rather identifies a qualitative level with respect to the boundaries of the tank 106 identified.

Some embodiments may further include a tank capacity identification system 118. The tank capacity identification system 118 identifies the capacity of the tank 106. In some embodiments, the novel graphical user interface 112 may include user input elements to facilitate identification of a tank capacity. In some embodiments, this can be accomplished by providing to the user in the graphical user interface 112, a selection of various commonly sized tank capacities. A user then can select from among these pre-populated and pre-provided choices to assist the tank capacity identification system 118 in identifying the capacity of the tank 106. Examples will be illustrated below of this functionality.

In alternative or additional embodiments, the tank capacity identification system 118 can provide user interface elements that allow a user to manually input tank size dimensions. This allows for tank capacities to be used that are non-standard sizes and/or not included in the enumerated tank capacities. Examples will be illustrated below of this functionality.

The solid arrow from the graphical user interface 112 to the tank capacity identification system 118 represents the user assisted input into the tank capacity identification system 118.

In alternative, or additional embodiments, the tank capacity identification system 118 may be able to measure and determine the tank capacity automatically. The dotted arrow from the image acquisition system 102 to the tank capacity identification system 118 illustrates an example where an image can be provided directly to the tank capacity identification system 118, where the tank capacity identification system 118 includes functionality for automatically identifying a capacity of the tank 106 in the acquired image 104.

For example, using LiDAR, augmented reality (AR) or other measurement tools, embodiments can estimate the size of the tank 106, and capacity thereof.

In some embodiments, ARKit available from Apple Corporation of Cupertino Calif. can be used to automatically identify tank capacities. In particular, the functionality available in ARKit, including the plane detection functionality, and measurement functionality can be used as part of the tank capacity identification system 118 to automatically (or with limited user assistance) measure tank capacity of the tank 106.

Embodiments further include a quantitative level determination system 120. This particular element of the tank inspection system 100 is able to identify a quantitative level with respect to the boundaries of the tank 106 identified by the boundary definition system 114, and potentially the capacity of the tank identified by the tank capacity identification system 118. The quantitative level determination system 120 identifies a quantitative value, such as a numeric value, defining the level of the tank 106 previously identified qualitatively. For example, using the boundaries of the tank 106, and the qualitative level of the tank 106, the quantitative level determination system 120 may be able to identify a numeric percentage of the level of the tank 106. For example, the quantitative level determination system 120 may be able to identify that the tank 106 is 15% of capacity.

In some embodiments, using the tank 106 capacity identified from the tank 106 capacity identification system, some embodiments may be able to identify a numeric value of the amount of substance in the tank 106.

FIG. 1 illustrates that the quantitative level determination system 120 receives inputs from the boundary definition system 114, the level identification system 116, and/or the tank capacity identification system 118. Using this information, the quantitative level determination system 120 can identify a quantitative level for the level of the substance in the tank 106. In particular, using various geometric computations, the quantitative level determination system can assign quantitative level values, such as numbers to the level indicated in the acquired image 104.

FIG. 1 further illustrates that the quantitative level determination system 120 is coupled to the user interface 112 such that the quantitative level determination system 120 can provide the quantitative values determined to the user interface 112. This allows the user interface 112 to display the quantitative values to the user, in some embodiments together with the acquired image 104. This provides new functionality in a new and improved user interface 112 in that quantitative values, that were previously not available in user interfaces, can now be provided to the user. In particular, previously, at best a user would have been able to see a qualitative representation of level but would not have been provided with the quantitative representation of the level of the tank 106 in the user interface 112. Embodiments allow a user to more quickly access tank level data in electronic devices, improving the speed of a user's navigation through various views to identify tank levels.

FIG. 1 further illustrates a level sharing system 122. The level sharing system 122 allows the quantitative level to be shared with other entities. As illustrated by the solid arrow from the user interface 112 to the level sharing system 122, in some embodiments a user can use the user interface 112 to share the quantitative level determined by the quantitative level determination system 120. For example, the user interface 112 may provide functionality to connect to an email system, data upload service, or other entity as a result of user input indicating that such actions should occur. The user can input email addresses, server addresses, or other endpoints into the user interface 112 allowing the user to specify where the quantitative level values should be sent.

In alternative or additional embodiments, as illustrated by the dotted arrow between the quantitative level determination system 120 and the level sharing system 122, embodiments may automatically share the values identified by the quantitative level determination system 120 other entities. In some embodiments, the user can use the user interface 112 to specify automatic sharing endpoints. The level sharing system 122 will then automatically share any quantitative level values to those endpoints when the results are received from the quantitative level determination system 120.

The level sharing system 122 may include certain network hardware or other components that allows the values obtained from the quantitative level determination system 120 to be shared with other remote entities. For example, in some embodiments, the level sharing system 122 may be configured to share values to a centralized service that maintains information about tank levels across a plurality of different tanks.

Figure 2:
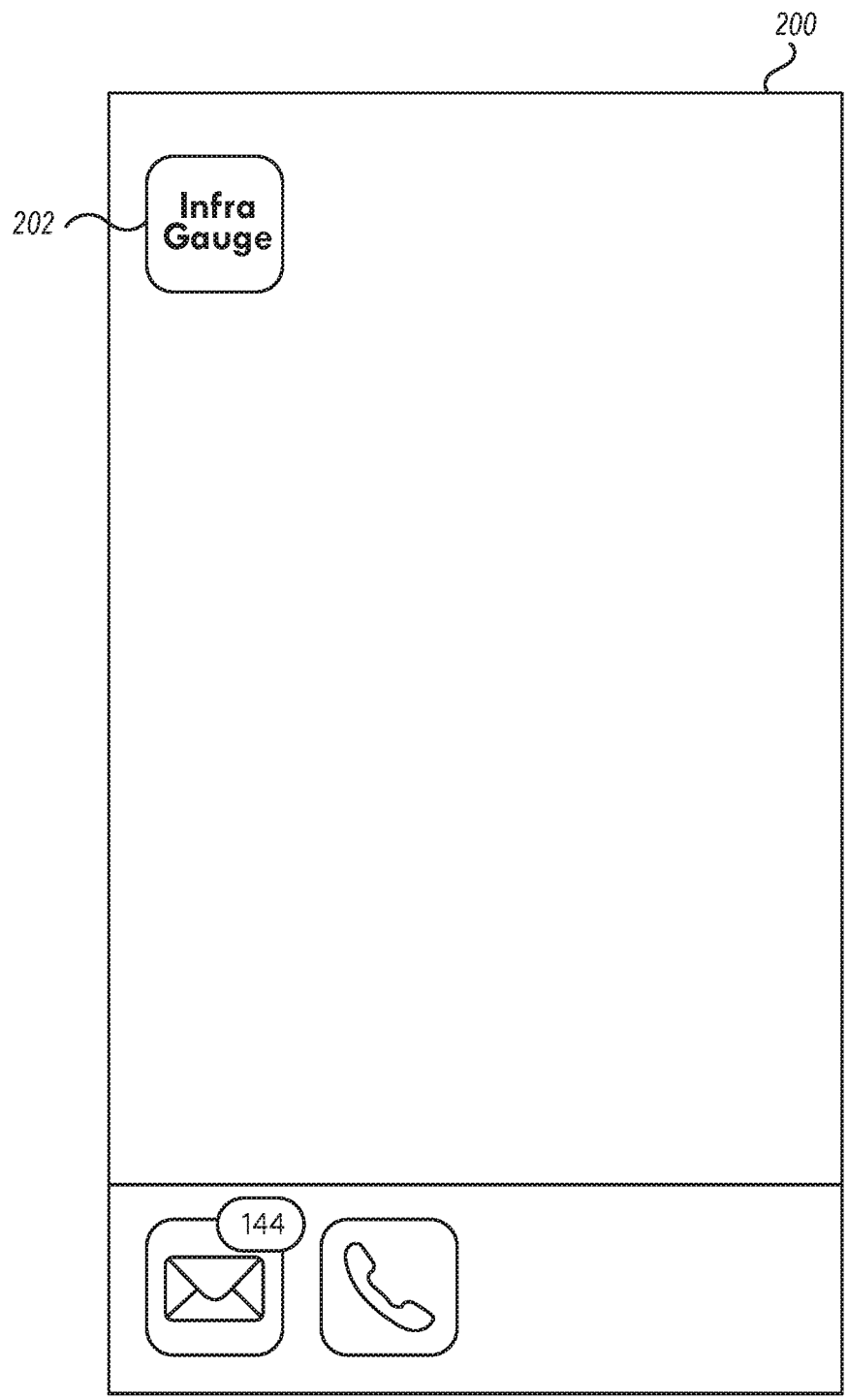
FIG. 2 illustrates a phone user interface.

The following illustrates how one embodiment may be implemented using a mobile device, such as a smart cellular phone, and an app. In particular, the following illustrates a new and unique user interface, along with various user interactions with the user interface. For example, the following includes various images and descriptions of the tank measurement app, including a description of how to navigate and use the tank measurement app. FIG. 2 illustrates a phone user interface 200 on a phone with an icon 202 for the tank measurement app.

A user launches the tank measurement app by clicking or selecting the tank measurement app icon 202. Once the app is opened the user will see the tank measurement app user interface 204, as illustrated in FIG. 3A. In some embodiments, the user will see the "Select Tank Size" screen 206 of the user interface 204. In this screen, the user can interact with various user interface elements, such as radio buttons as shown or other elements, or by direct interaction with size input elements, to select if the user wishes to use nominal tank sizes, such as those commonly used in the Oil and Gas industry, or to enter a specific height, diameter and/or BBL/inch. For example, the screen 206 shows a nominal section 208 and a manual input section 210.

The user can select the nominal section 208 by selecting the radio button 212 (or other interface element as appropriate) or by simply interacting with input elements of the nominal section 208. For example, the user could select the drop-down interface 214. Selecting the drop-down interface causes the list element 216 to be displayed. The list interface 216 allows a user to scroll through the pre-populated, common tank sizes. For example, in the current example, the tank sizes include:

90 BBL Nominal Capacity—10'×7'11"—3,780 gallon
100 BBL Nominal Capacity—8'×9'6"—4,200 gallon
150 BBL Nominal Capacity—12'×9'6"—6,300 gallon
200 BBL Nominal Capacity—10'×12'—8,400 gallon
210 BBL Nominal Capacity—15'×10'—8,820 gallon
250 BBL Nominal Capacity—15'×11'—10,500 gallon
300 BBL Nominal Capacity—15'×12'—12,600 gallon
400 BBL Nominal Capacity—20'×12'—16,800 gallon
500 BBL Nominal Capacity—25'×12'—21,000 gallon
500 BBL Nominal Capacity—16'×15'6"—21,000 gallon
750 BBL Nominal Capacity—24'×15'6"—31,500 gallon Alternatively, a user could select the radio button 212 for manual entry of a tank size. Alternatively, the user could simply begin entering dimensions into the text input boxes provided. In particular, either of these actions, or other appropriate actions would activate the manual input section 210 of the "Select Tank Size" screen 206 of the user interface 204. Here a user could manually enter height, diameter, and BBL/inch value.

Note that the BBL/inch is barrels per inch and is a common measuring unit used in oil and gas tank gauging.

Figure 3B:
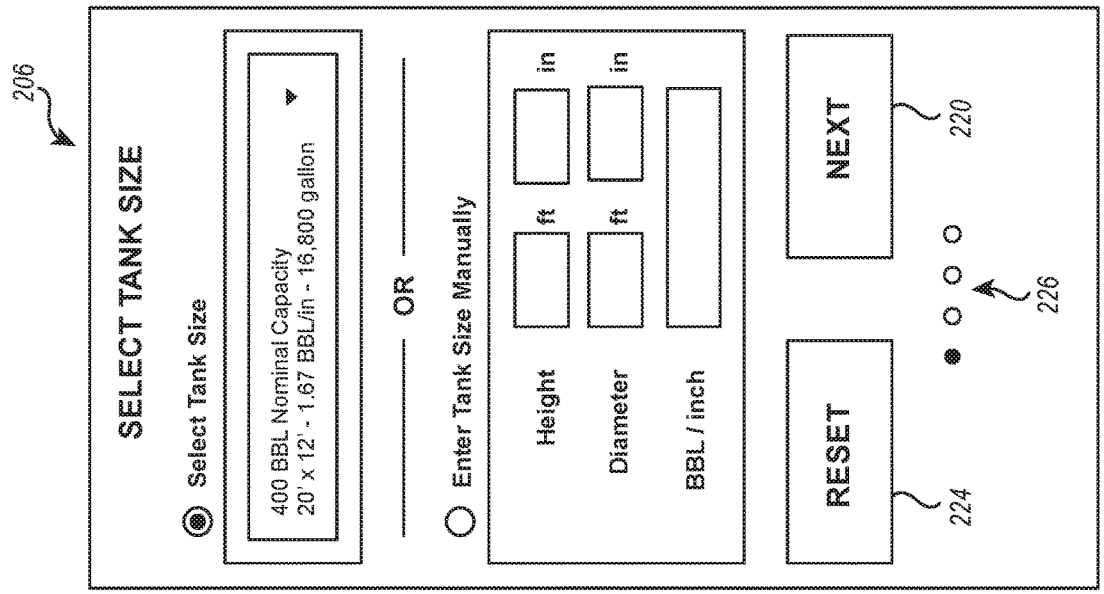
FIG. 3B illustrates another state of the tank size screen.
Figure 3A:
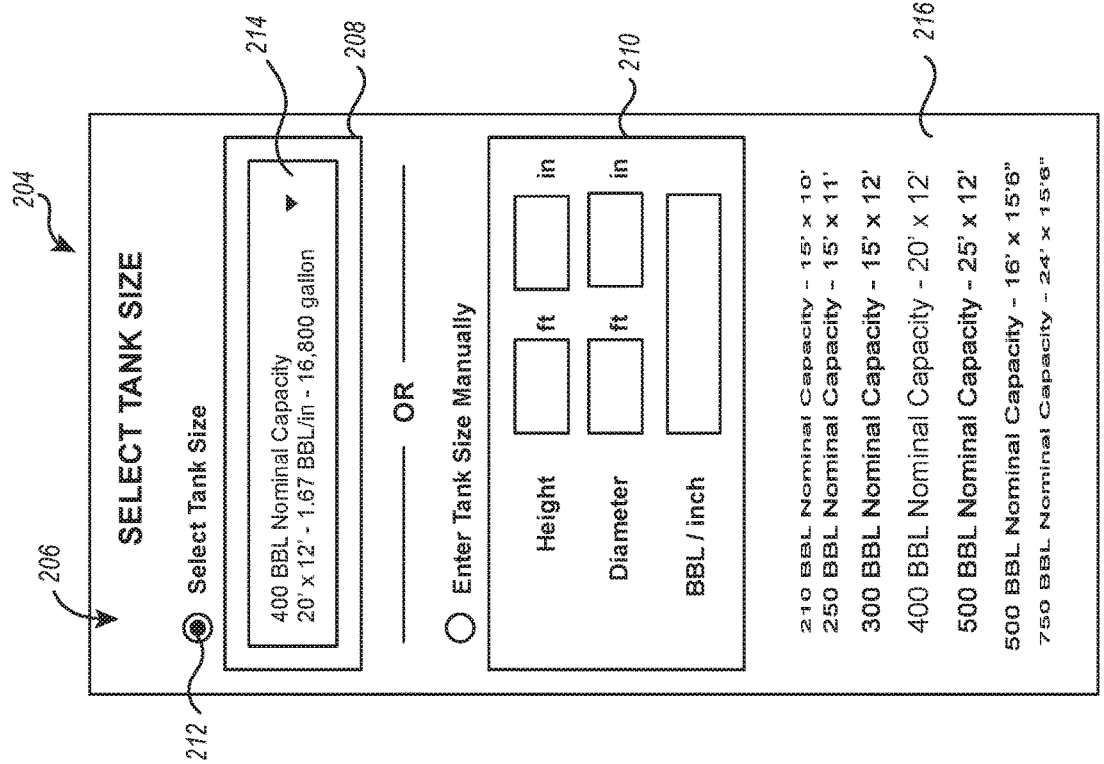
FIG. 3A illustrates a tank size screen.
Figure 4B:
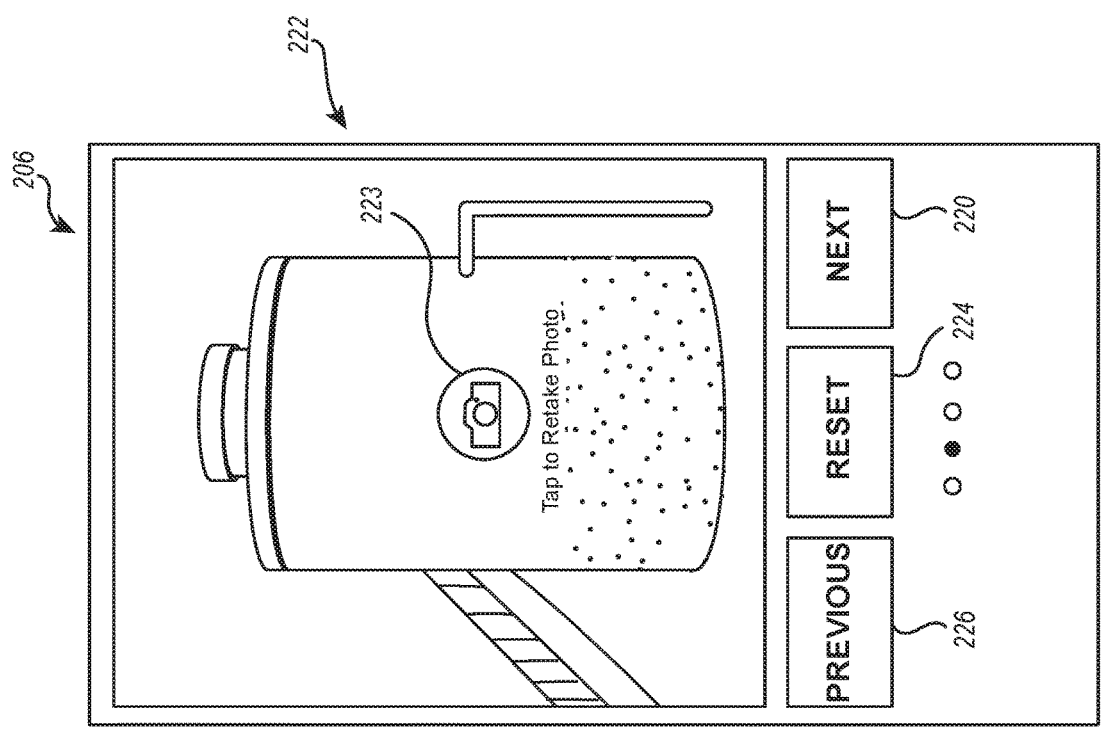
FIG. 4B illustrates another state of the acquire photo screen.
Figure 4A:
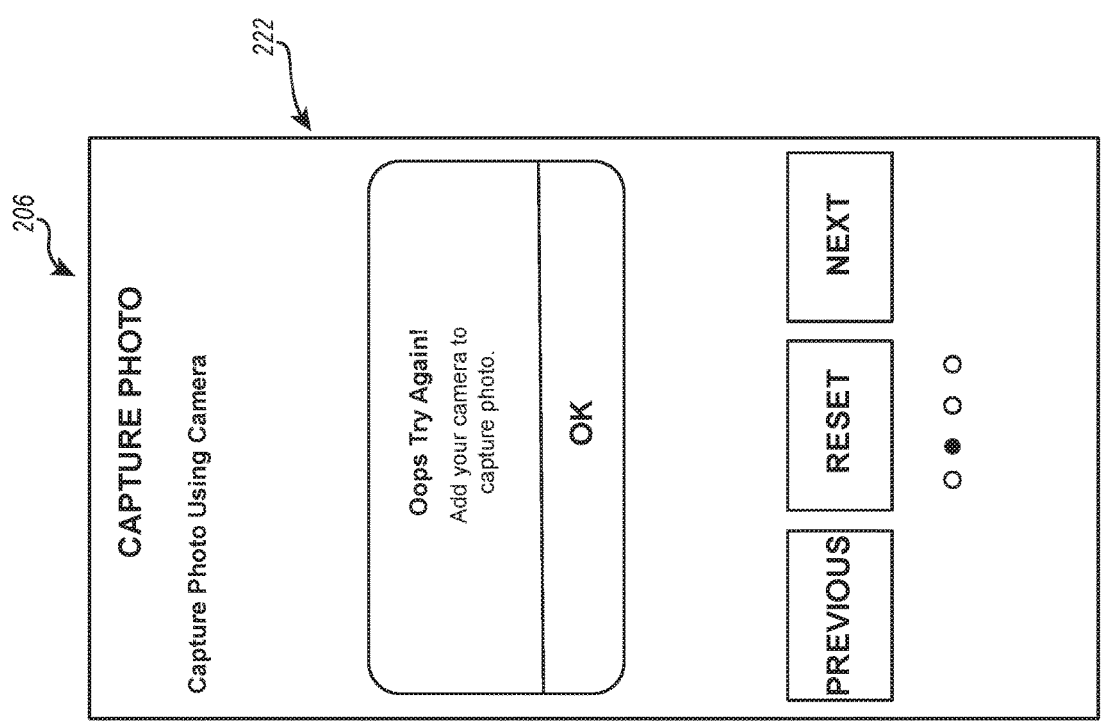
FIG. 4A illustrates an acquire photo screen.

Once the user makes their selection with respect to tank size, as illustrated in FIG. 3B, the user can click on the next button 220 (or other appropriate interface element, such as swiping the screen 206 to the left, tilting the phone or other device, or other action) to go to the next screen (i.e., the Acquire Photo Screen 222) as illustrated in FIGS. 4A and 4C. Note that the Select Tank Size screen 206 may also display a reset button 224. In some embodiments, the reset button 224 will appear once the user selection and or setting of tank size is complete. Selecting the reset button 224 resets the selections in the Select Tank Size screen 206, which will allow the user to start over in selecting a tank size.

Note that the Select Tank Size screen 206 (and other screens of the user interface 204 include, at the bottom of the screen, four dots 226. This interface element shows the user where the user is at in the progression of the four main screens of the user interface 204. In the example shown, the first dot is darker than the remaining three dots indicating that the user in the first major screen of the four screens of the user interface 204.

Clicking the next button 220 (in the illustrated example) causes the Capture Photo screen 222 of the user interface 204 to be displayed. Three different potential Capture Photo screen 222 variants may be displayed in the embodiment illustrated. For example, in one aspect, if a camera is not available, the Capture Photo screen 222 of the user interface 204 illustrated in FIG. 4A will be displayed indicating that the user should connect and/or enable a camera. If the user connects a camera after seeing this version of the screen 222, then the screen 222 will display an image as illustrated in FIG. 4B. As noted previously, in some embodiments, the camera is a FLIR One Pro thermal camera available from FLIR System of Wilsonville, Oreg., although other cameras can be used. Notably, depending on tank types, a thermal camera may not be needed, such as for example when the tank is a polyethylene tank.

The version of the screen 222 illustrated in FIG. 4B includes an element 223 that allows the app to acquire an image for use in determining quantitative tank level. In particular, the user will be able to tap the element 223 to take an image of a tank. Once the user has taken the image of the tank, the user will have the options to retake the image by tapping again, press the reset button to go back to the beginning, press the previous button 226 to go to the previous screen 206, or press the next button to continue on. In some embodiments, the app directly interfaces with the camera's SDK file to capture the image.

Note that in some embodiments, as illustrated in FIG. 4C, the Capture Photo screen may include an upload image interface element 228. This element allows a user to facilitate acquiring an image from an image storage source. For example, this screen may allow the app to obtain an image from memory or mass storage on the phone (or other device). The image could have been previously taken by the device, downloaded from another source, or otherwise obtained. Note that in some embodiments, the screen 222 includes interface elements to allow the app to contact a remote service, such as a web service or other service, to obtain an image.

Once the user presses the next button, the "Define Tank Corners and Level" screen 230 shown in FIG. 5A will appear. Here the user can use an acquired image to define tank boundaries. In the example illustrated, a user aligns four boundary marker elements 232-1 through 232-4 (which in this case are displayed as cross-hair elements) with the corners of the image of the tank.

Figure 5B:
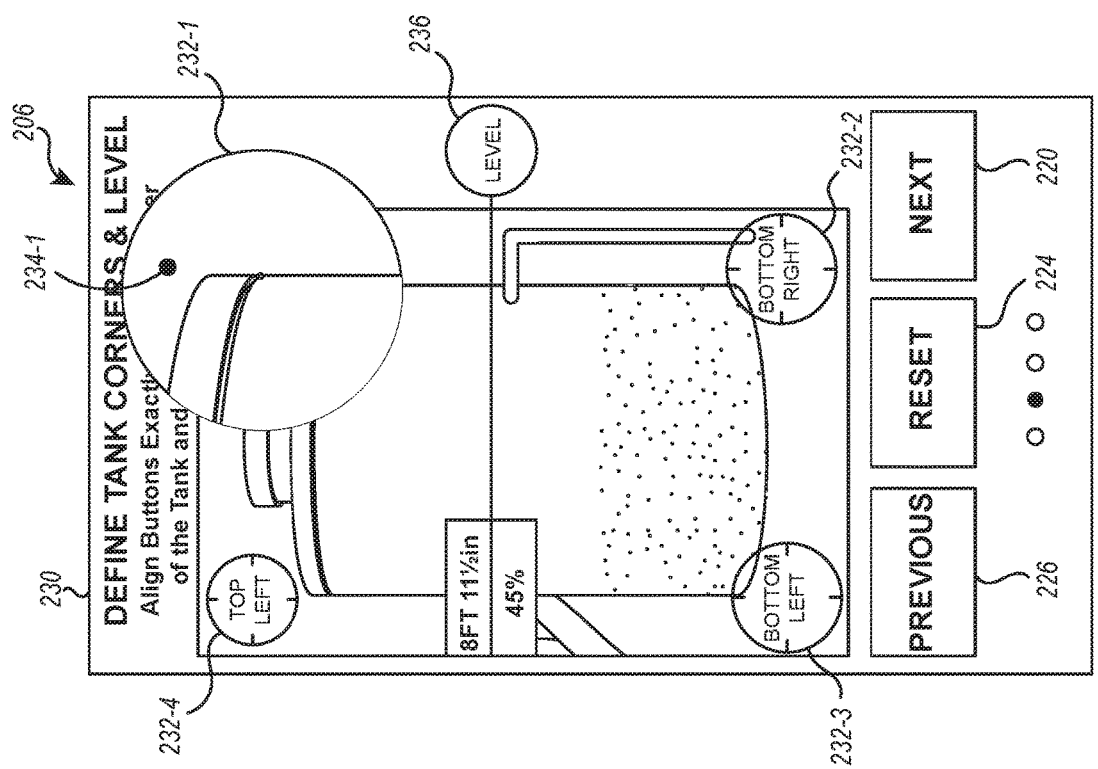
FIG. 5B illustrates another state of the define tank corners and level screen.

As illustrated the example shown in FIG. 5B, when touching (or otherwise providing user input at) a boundary marker element 232-1, the boundary marker element 232-1 will magnify a portion of the image proximate the boundary marker element 232-1 and be offset from where the user's finger is touching the screen. This will assist the user in finding the corner of the tank in the image and to align a definition point 234-1 to that corner.

Note that while the embodiment illustrated here shows user assisted determination of tank corners (i.e., tank boundaries), some embodiments may use automated boundary determination. For example, various image analysis functions may be automatically performed to identify shading and/or other differences to automatically adjust the boundary determination, rather than relying on user input. Note that in some embodiments, automated functionality may be used, but the user may be given an opportunity to fine tune the automated determination of boundaries. In some embodiments, when the user provides additional fine tuning, this input may be used by a machine learning system to modify the automated boundary determination systems to make those systems more accurate in future automated boundary determinations.

Once the user aligns all of the corners of the image of the tank to definition points, the user will then align the substance level line using a level interface element 236 to where the qualitative level is seen in the image. The level interface element 236, in the example illustrated, will give a quantitative live, automatically adjusting, readout of at least one of the height of the substance in the tank, the percent fill of the tank, and/or the volume of the substance in the tank as the user interacts with the level interface element 236 by moving the line up and down. This provides a new and unique interface to the user that allows the user to instantly access information that would have previously been unavailable to the user by simply viewing an image of the tank. In particular, the user interface 204 provides quantitative analysis of the tank using a qualitative image. Previously, this information would not have been instantly available to the user.

Note that while the embodiment illustrated here shows user assisted determination of qualitative level, some embodiments may use automated qualitative level determination. For example, various image analysis functions may be automatically performed to identify shading and/or other differences to automatically adjust the qualitative level determination, rather than relying on user input. Note that in some embodiments, automated functionality may be used, but the user may be given an opportunity to fine tune the automated determination of qualitative level. In some embodiments, when the user provides additional fine tuning, this input may be used by a machine learning system to modify the automated qualitative level determination systems to make those systems more accurate in future automated qualitative level determinations.

Again, the user can press the reset button 224 and start over from the beginning, press the previous button 226 to take them to the previous screen.

Figure 6:
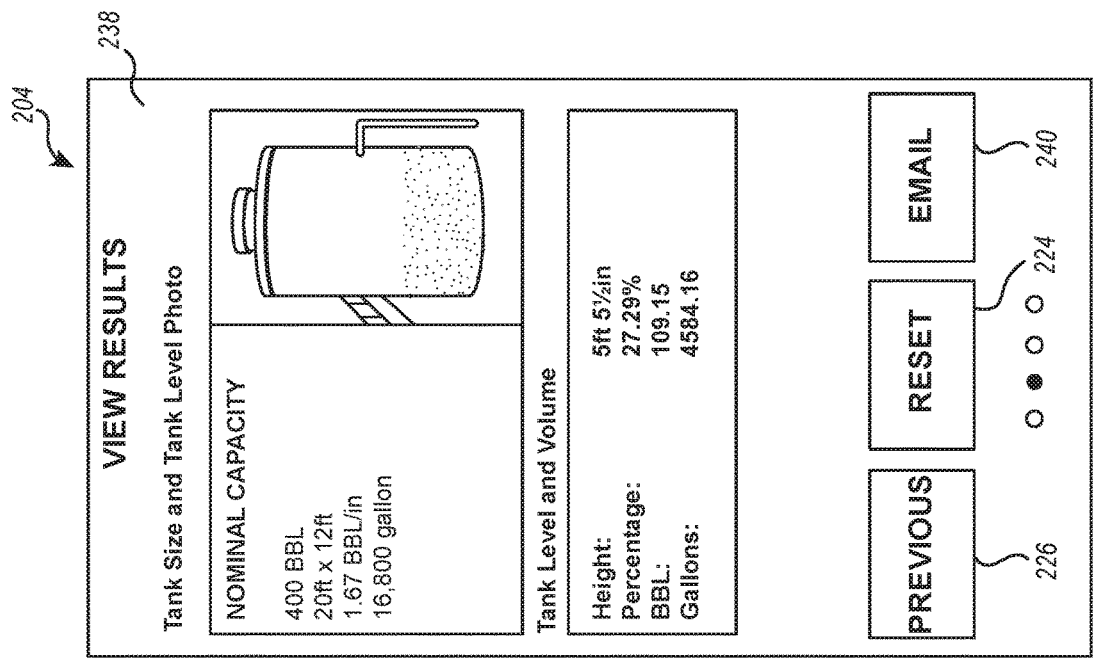
FIG. 6 illustrates a view results screen.

The app will then use various geometric functions to calculate the volume in the tank, which can then be displayed in a screen of the user interface 204, such as the 'View Results' screen 238 shown in FIG. 6 that is rendered when the user presses the next button 220 in the screen 230. Again, the unique user interface nearly instantly, and in an easily accessible fashion, provides information and details that were not previously available in other systems and user interfaces.

In this screen 238, the user can see the capacity of the tank with an image of the tank and its level in the image that was taken. The user will also be able to see what the substance volume of the tank is in height (measured in feet and inches in the example illustrated), percent fill of the tank, the number of barrels, and the number of gallons. Now the user can choose to reset by pressing the reset button 224, go to the previous screen 230 by pressing the previous button or email the results by pressing the email button 240.

Figure 8:
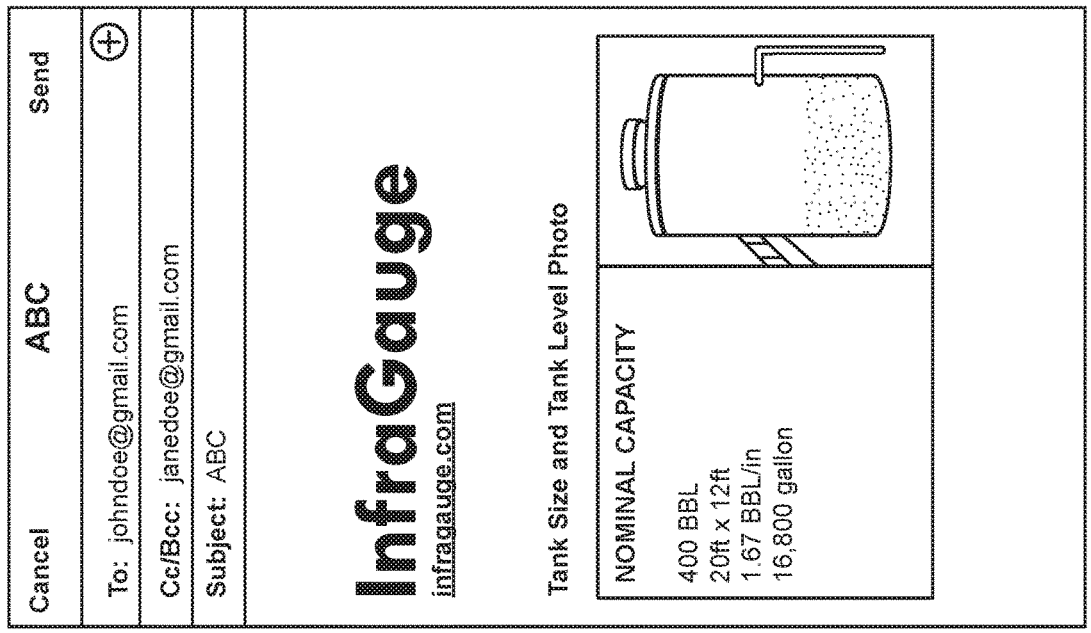
FIG. 8 illustrates an email app interface.
Figure 7:
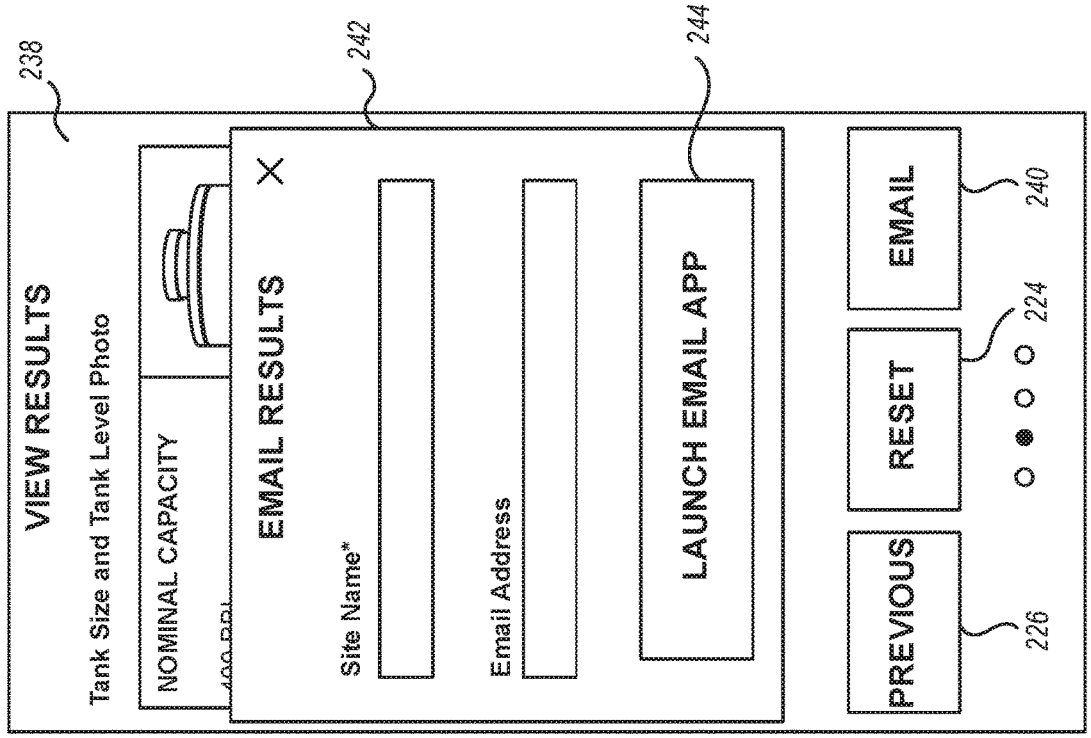
FIG. 7 illustrates an email results screen.

Once the user selects the email option by pressing the email button 240, an 'Email Results' interface element 242 is rendered as illustrated in FIG. 7. Here the user enters the desired site name (e.g., the site of the tank in the image) and the email address the user wants to send the results to. The user will then press the launch email app button 244. This will take the user into the default email app (or provide a selection of an app) of the user's email account as illustrated in FIG. 8. The site name will appear in the subject, the desired email will be in the To box and the users default email will be in the CC/Bcc box. In some instances, a corresponding logo and website for the tank measurement app will also be in the email along with a screen shot of the "View Results" screen.

Note that while email is illustrated here, it should be appreciated that other sharing methods may be implemented, alternatively or additionally. For example, in some embodiments, the user may be provided with FTP, cloud service interfaces, or other interfaces to allow the user to upload the results to a result storage and/or processing service. In some embodiments, the results may be automatically shared via email or other sharing service without additional user specification. For example, the screen in FIG. 6 may include a sharing button that when selected automatically sends the results to a pre-specified endpoint.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 9:
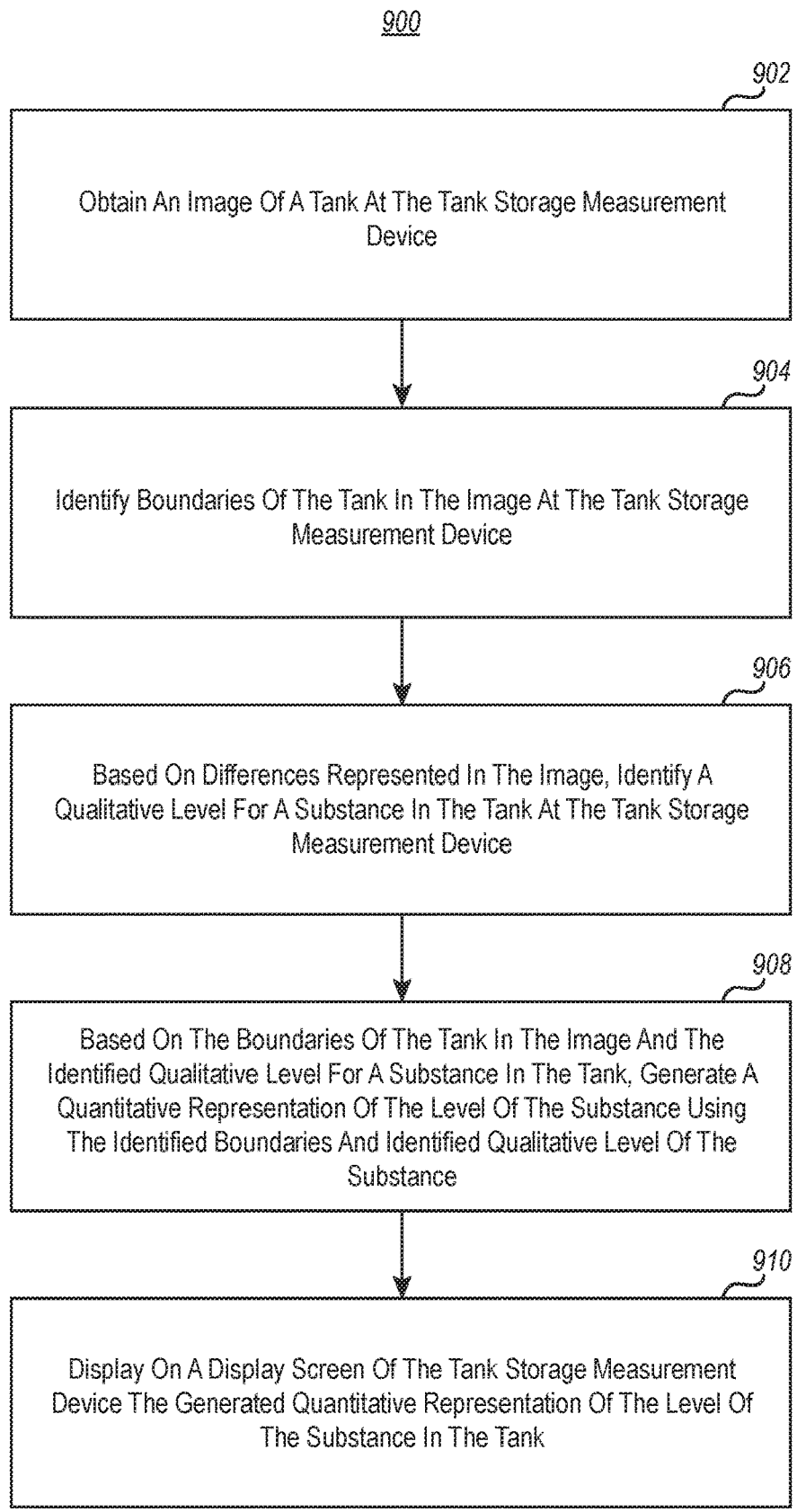
FIG. 9 illustrates a method of measuring a method of performing storage tank measurements.

Referring now to FIG. 9, a method 900 is illustrated. The method 900 includes acts for safely performing storage tank measurements using a tank storage measurement device. The method includes obtaining an image of a tank at the tank storage measurement device (act 902). For example, an image may be captured using a thermal or other camera. Alternatively, an image may be downloaded and/or uploaded.

The method 900 further includes identifying boundaries of the tank in the image at the tank storage measurement device (act 904). This may be performed with manual assistance at the tank storage measurement device, automatically by the tank storage measurement device, or in other appropriate fashions.

The method 900 further includes based on differences represented in the image, identifying a qualitative level for a substance in the tank at the tank storage measurement device (act 906).

The method 900 further includes based on the boundaries of the tank in the image and the identified qualitative level for a substance in the tank, generating a quantitative representation of the level of the substance using the identified boundaries and identified qualitative level of the substance (act 908).

The method 900 further includes displaying on a display screen of the tank storage measurement device the generated quantitative representation of the level of the substance in the tank (act 910).

The method 900 may be practiced where obtaining an image comprises taking a thermal image, and wherein differences represented in the image comprise temperature differences represented in the image.

The method 900 may further include identifying a size of the tank. For example, in some embodiments, identifying the size of the tank includes receiving user input at the display screen for the size of the tank. In some embodiments identifying the size of the tank comprises using augmented reality at the tank storage measurement device to measure the size of the tank.

The method 900 may be practiced where identifying boundaries of the tank in the image at the tank storage measurement device comprises receiving user input at the display screen moving boundary marker elements to corners of the tank in the image of the tank. Some such embodiments may further include magnifying portions of the image proximate the user input at the display screen.

The method 900 may be practiced where displaying on a display screen of the tank storage measurement device the generated quantitative representation of the level of the substance in the tank comprises displaying on the display screen a live, an automatically adjusting readout of at least one of a height of the substance in the tank, a percent fill of the tank, or a volume of the substance in the tank as the user interacts with a level interface element.

The disclosed equipment, including unique and novel interfaces, allows tank gaugers to acquire infrared images or other images of tanks and then allows them to gauge the tank. This eliminates exposure to harmful fumes, ignition sources, (including static electricity), the need for self-grounding, and the risks associated with climbing stairs in all weather conditions. In this regard, the disclosed application interfaces can be used to help keep tank gaugers safe and provide a more efficient way of tank gauging.

In some embodiments, the disclosed infrared gauge application interfaces allows a user to input tank data sizes (height, diameter, barrels per inch (bbl/in)) or to choose from a variety of nominal tank sizes used in industry. The user is then able to acquire an image using an infrared camera (or other camera) or other source, then using an application with specialized user interface elements, put markers or indicators at specific points on the tank image; on the top and bottom corners of each side of the tank as well as lining up the liquid level—the application then computes the volume of a substance in the tank and the user can then email a screenshot of the substance volume, site location, as well as the infrared image.

In some alternative embodiments, the tank measurement app is configured with software for enabling the application to do the following:

Find the tank and tank level automatically

Upload infrared images from auxiliary cameras and devices (e.g., drones, phones, and so forth) in order to gauge tanks Find substance volume for many types/sizes of tanks and differentiate between different types of substances in the tanks (e.g., oil and water)

Share the app and results on social media sites

Store locations (names, tanks numbers and names, other customer desired information)

this will aid in location services and the app will automatically bring up what well site a user is at as well as the tanks on that site the user will also have the ability to trend historical data access historical data (including tank images) for an account/tank based on user account data stored remotely and according to user specific contract plans via web site access Interface with producers' tank data programs (EVIN, FieldLink, etc.) to automatically upload tank level and volume information along with respective dates and times.

Embodiments of the application can be used on a phone device, a phablet, a tablet, a laptop, or other computing device. It will be appreciated that the foregoing embodiments may be practiced by a computer system having stored computer-executable instructions that, when executed by one or more processors of the computing system, cause various functions to be performed by the computing system, such as the acts recited in the disclosed methods.

Embodiments of the present invention may comprise or utilize a special-purpose or general-purpose computer including computer hardware, as discussed in greater detail below, as well as physical and other computer-readable media for carrying or storing computer-executable instructions and/or data structures. Such computer-readable media can be any available media that can be accessed by a general purpose or special-purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special-purpose computer.

A network, which may include network connections is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special-purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A tank storage measurement device comprising:
a display screen, the tank storage measurement device being configured to display on the display screen an image of a storage tank,
wherein the tank storage measurement device is additionally configured to use the image of the storage tank to identify boundaries of the storage tank and identify a qualitative level of a substance in the storage tank;
wherein the tank storage measurement device is additionally configured to generate a quantitative representation of the level of the substance using the identified boundaries and identified qualitative level of the substance;
wherein the tank storage measurement device is additionally configured to display on the display screen the generated quantitative representation of the level of the substance; and
wherein the tank storage measurement device is configured to identify the boundaries of the storage tank by graphical user input at user adjustable boundary marker elements displayed on the display screen.

2. The tank storage measurement device of claim 1, wherein the quantitative representation of the level of the substance comprises a numerical representation of at least one of a level of the tank as a percentage of tank capacity or a volume of the substance in the tank.

3. The tank storage measurement device of claim 1, wherein the tank storage measurement device is further configured to identify a capacity of tank.

4. The tank storage measurement device of claim 3, wherein the tank storage measurement device is configured to identify the capacity of the tank using LiDAR or AR measurements.

5. The tank storage measurement device of claim 3, wherein the tank storage measurement device is configured to identify the capacity of the tank by user input.

6. The tank storage measurement device of claim 1, wherein the tank storage measurement device is configured to magnify a portion of the image of the storage tank proximate an adjustable boundary marker element when the user provides input at the boundary marker element.

7. The tank storage measurement device of claim 1, wherein the tank storage measurement device is configured to identify the qualitative level of the substance in the storage tank by graphical user input at a level interface element.

8. The tank storage measurement device of claim 7, wherein the tank storage measurement device is configured to display on the display screen a live, automatically adjusting, readout of at least one of a height of the substance in the tank, a percent fill of the tank, or a volume of the substance in the tank as the user interacts with the level interface element.

9. A method of safely performing storage tank measurements using a tank storage measurement device, the method comprising:
obtaining an image of a tank at the tank storage measurement device;
identifying boundaries of the tank in the image at the tank storage measurement device;
based on differences represented in the image, identifying a qualitative level for a substance in the tank at the tank storage measurement device;
based on the boundaries of the tank in the image and the identified qualitative level for a substance in the tank, generating a quantitative representation of the level of the substance using the identified boundaries and identified qualitative level of the substance;
displaying on a display screen of the tank storage measurement device the generated quantitative representation of the level of the substance in the tank; and
identifying a size of the tank, wherein identifying the size of the tank comprises receiving user input at the display screen for the size of the tank.

10. The method of claim 9, wherein obtaining an image comprises taking a thermal image, and wherein differences represented in the image comprise temperatures differences represented in the image.

11. The method of claim 9, wherein identifying the size of the tank comprises using augmented reality at the tank storage measurement device to measure the size of the tank.

12. The method of claim 9, wherein identifying boundaries of the tank in the image at the tank storage measurement device comprises receiving user input at the display screen moving boundary marker elements to corners of the tank in the image of the tank.

13. The method of claim 12, further comprising magnifying portions of the image proximate the user input at the display screen.

14. The method of claim 9, wherein displaying on a display screen of the tank storage measurement device the generated quantitative representation of the level of the substance in the tank comprises displaying on the display screen a live, automatically adjusting readout of at least one of a height of the substance in the tank, a percent fill of the tank, or a volume of the substance in the tank as the user interacts with a level interface element.

15. A tank storage measurement device comprising:
one or more processors; and
one or more computer-readable media having stored thereon instructions that are executable by the one or more processors to configure a computer system to measure tank storage, including instructions that are executable to configure the computer system to perform at least the following:
obtain an image of a tank at the tank storage measurement device;
identify boundaries of the tank in the image at the tank storage measurement device;
based on differences represented in the image, identify a qualitative level for a substance in the tank at the tank storage measurement device;
based on the boundaries of the tank in the image and the identified qualitative level for a substance in the tank, generate a quantitative representation of the level of the substance using the identified boundaries and identified qualitative level of the substance;
display on a display screen of the tank storage measurement device the generated quantitative representation of the level of the substance in the tank; and
identify a size of the tank, wherein identifying the size of the tank comprises receiving user input at the display screen for the size of the tank.

16. The tank storage measurement device of claim 15, wherein obtaining an image comprises taking a thermal image, and wherein differences represented in the image comprise temperatures differences represented in the image.

17. The tank storage measurement device of claim 15, wherein displaying on a display screen of the tank storage measurement device the generated quantitative representation of the level of the substance in the tank comprises displaying on the display screen a live, automatically adjusting readout of at least one of a height of the substance in the tank, a percent fill of the tank, or a volume of the substance in the tank as the user interacts with a level interface element.

18. The tank storage measurement device of claim 15, wherein identifying the size of the tank comprises using augmented reality at the tank storage measurement device to measure the size of the tank.

19. The tank storage measurement device of claim 15, wherein identifying boundaries of the tank in the image at the tank storage measurement device comprises receiving user input at the display screen moving boundary marker elements to corners of the tank in the image of the tank.

20. The tank storage measurement device of claim 19, wherein the one or more computer-readable media have stored thereon instructions that are executable by the one or more processors to configure the computer system to magnify portions of the image proximate the user input at the display screen.

\* \* \* \* \*